US011110686B2

United States Patent
Becker et al.

(10) Patent No.: US 11,110,686 B2
(45) Date of Patent: Sep. 7, 2021

(54) HOT-WORKING MATERIAL, COMPONENT AND USE

(71) Applicants: ThyssenKrupp Steel Europe AG, Duisburg (DE); thyssenkrupp AG, Essen (DE)

(72) Inventors: Jens-Ulrik Becker, Duisburg (DE); Stefan Myslowicki, Monchengladbach (DE)

(73) Assignee: thyssenkrupp AG, Essen (DE)

( * ) Notice: Subject to any disclaimer, the term of this patent is extended or adjusted under 35 U.S.C. 154(b) by 8 days.

(21) Appl. No.: 16/612,817

(22) PCT Filed: May 16, 2017

(86) PCT No.: PCT/EP2017/061773
§ 371 (c)(1),
(2) Date: Jul. 8, 2020

(87) PCT Pub. No.: WO2018/210415
PCT Pub. Date: Nov. 22, 2018

(65) Prior Publication Data
US 2020/0346436 A1    Nov. 5, 2020

(51) Int. Cl.
*B32B 15/01*    (2006.01)
*B21D 22/02*    (2006.01)
(Continued)

(52) U.S. Cl.
CPC .......... *B32B 15/011* (2013.01); *B21D 22/02* (2013.01); *C22C 38/002* (2013.01); *C22C 38/02* (2013.01);
(Continued)

(58) Field of Classification Search
CPC ... B32B 15/011; B32B 2250/03; B21D 22/02; C22C 38/002; C22C 38/02; C22C 38/04;
(Continued)

(56) References Cited

U.S. PATENT DOCUMENTS

| 9,597,750 | B2* | 3/2017 | Canourgues et al. ........................ B23K 26/362 |
| 2019/0176436 | A1* | 6/2019 | Pieronek ............... B32B 15/011 428/683 |
| 2020/0061971 | A1* | 2/2020 | Wolske et al. .......... B32B 15/01 |

FOREIGN PATENT DOCUMENTS

| DE | 102005006606 | | 3/2006 |
| DE | 102008022709 | A1 | 11/2009 |

(Continued)

OTHER PUBLICATIONS

M. Merklein et al., "A review on tailored blanks—Production, applications and evaluation", Feb. 2014, Journal of Materials Processing Technology, 214, p. 151-164 (Year: 2014).*

(Continued)

*Primary Examiner* — Humera N. Sheikh
*Assistant Examiner* — John D Schneible
(74) *Attorney, Agent, or Firm* — RMCK Law Group PLC

(57) ABSTRACT

The invention relates to a hot-forming material composed of a three-layer composite material, comprising a core layer of a hardenable steel which in the press-hardened state of the hot-forming material has a tensile strength >1900 MPa and/or a hardness >575 HV10. Two outer layers are bonded substance-to-substance with the core layer and composed of a steel which is softer in comparison with the core layer and which in the press-hardened state of the hot-forming material have a tensile strength >750 MPa and/or a hardness >235 HV10. The invention further relates to a component and also to a corresponding use.

18 Claims, 1 Drawing Sheet

(51) Int. Cl.
| | |
|---|---|
| *C22C 38/00* | (2006.01) |
| *C22C 38/02* | (2006.01) |
| *C22C 38/04* | (2006.01) |
| *C22C 38/06* | (2006.01) |
| *C22C 38/26* | (2006.01) |
| *C22C 38/28* | (2006.01) |
| *C22C 38/32* | (2006.01) |

(52) U.S. Cl.
CPC ............... *C22C 38/04* (2013.01); *C22C 38/06* (2013.01); *C22C 38/26* (2013.01); *C22C 38/28* (2013.01); *C22C 38/32* (2013.01); *B32B 2250/03* (2013.01)

(58) Field of Classification Search
CPC ......... C22C 38/06; C22C 38/26; C22C 38/28; C22C 38/32; Y10T 428/12951; Y10T 428/12958; Y10T 428/12965
USPC ......................................................... 428/683
See application file for complete search history.

(56) References Cited

FOREIGN PATENT DOCUMENTS

| DE | 102014114365 A1 | 4/2016 |
|---|---|---|
| DE | 102015114989 | 9/2016 |
| DE | 102015116619 A1 | 3/2017 |
| EP | 2886332 A1 | 6/2015 |
| JP | H03133630 A | 6/1991 |

OTHER PUBLICATIONS

Steel Express, "Steel Hardness Conversion Table", Jun. 2012 (Year: 2012).*

GalvInfo Center, "How Zinc Protects Steel", Dec. 2017 (Year: 2017).*

International Search Report and Written Opinion for International Application No. PCT/EP2017/061773 dated Sep. 28, 2017 with English translation, 15 pages.

DIN EN ISO 6507-1:2005—Metallic materials—Vickers Hardness Test.

DIN EN ISO 6507-2:2005—Metallic materials—Vickers Hardness Test Part 2.

DIN EN ISO 6507-3:2005—Metallic materials—Vickers Hardness Test Part 3.

DIN EN ISO 6507-4:2005—Metallic materials Vickers Hardness Test Part 4.

VDA 238-100—Plate bending test for metallic materials.

* cited by examiner

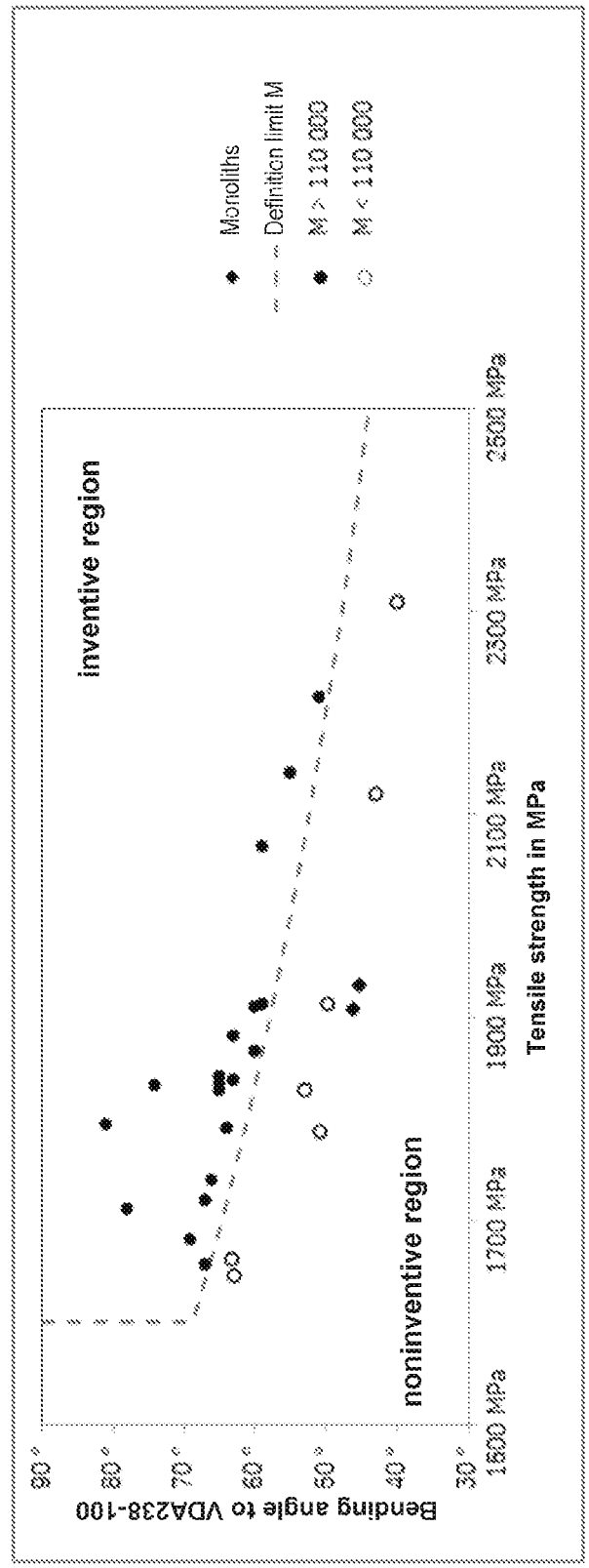

HOT-WORKING MATERIAL, COMPONENT AND USE

CROSS-REFERENCE TO RELATED APPLICATIONS

This application is a 371 U.S. National Stage of International Application No. PCT/EP2017/061773, filed May 16, 2017. The disclosure of the above application is incorporated herein by reference in its entirety.

TECHNICAL FIELD

The invention relates to a hot-forming material composed of a three-layer composite material.

TECHNICAL BACKGROUND

Within the automobile industry there is a search for new solutions for reducing vehicle weight and thereby reducing fuel consumption. In order to be able to lower the weight of a vehicle, a key element is lightweight construction. This may be achieved by measures including the use of materials of increased strength. The increase in strength generally comes at the expense of capacity for bending. In order to safeguard the occupant protection that is a requirement in the case of crash-relevant components, even in spite of the increased strength to achieve lightweight construction, it is necessary to ensure that the materials employed are able to convert the energy introduced by a crash, by means of deformation. This entails a high degree of capacity to be worked, especially in the crash-relevant components of a vehicle's structure. One means of saving weight, for example, is for the bodywork and/or the chassis of a land vehicle to be given an even lighter design and construction, by means of innovative materials in comparison to the materials conventionally employed. Thus, for example, on a component-specific basis, conventional materials can be replaced with materials having thinner walls but with comparable properties. For example, hybrid materials or composite materials are entering into the automobile industry to an ever greater extent, and are composed of two or more different materials, with each individual material having defined properties, in some cases conflicting properties, which are united in the composite material in order to achieve improved properties in the composite material by comparison with the individual, monolithic materials. Composite materials, especially those composed of different steels, are known in the prior art, as for example from the German laid-open specification DE 10 2008 022 709 A1 or from the European laid-open specification EP 2 886 332 A1.

A steel composite material designed for hot forming is sold by the applicant under the trade name "Tribond®" 1200 and 1400. An extremely high-strength, hardenable steel core layer and ductile steel outer layers in different thicknesses of material are used in order to achieve the objective of high strength and ductility. In order to achieve acceptable residual workability in the press-hardened state for such pairing of materials, the ductile partner in the laminate is given a high thickness of material. This reduces the strength of the composite material in two ways: firstly, it is a result of the ductile component itself; secondly, the strength of the core is lowered because of diffusion flows of the alloy elements between the partners in the laminate, these diffusion flows occurring in the course of manufacture (hot roll cladding) and of processing (hot forming). For example, carbon diffuses from the core layer into the outer layer, and causes the latter to harden, so lowering the strength in the core region at the same time. Where thin outer layers are used, the overall strength achieved is indeed high, but the diffusion processes result in comparatively great hardening of the ductile partner in the laminate, meaning that ultimately the ductility objectives cannot be achieved.

In the case of hot forming, the steel composite materials mentioned at the outset are cut to form blanks and heated to austenitization temperature, before being subsequently hot-formed and cooled in a cooled mold. As a result of intense cooling, necessitating cooling rates of at least 27 K/s in the case of use of a 22MnB5 as core layer, the structure undergoes complete transformation from austenite to martensite, and the material, processed to a component, acquires its desired high strength in the core layer in the press-hardened state. Among those skilled in the art, this process is also known by the term "press hardening". The steel composite materials employed for this process are provided with an aluminum-based coating, such as an AlSi coating, for example, in order to prevent unwanted scaling when the steel blank is heated to austenitization temperature.

The steel composite material has so far been designed for hot forming on the basis of the mechanical properties. A disadvantage, owing to the chemical composition of the partners in the laminate, is the interaction of the local alloy elements, particularly during manufacture to form the composite material and during the hot forming, resulting in unsatisfactory strength and/or ductility of the composite material.

SUMMARY OF THE INVENTION

It is an object of the present invention to provide a hot-forming material which despite diffusion processes occurring in manufacturing and processing exhibits smaller changes in the properties of the individual layers (laminate partners) than in comparison to the composite materials known from the prior art, with at the same time high strength and ductility in the near-surface region.

This object is achieved by means of a hot-forming material having the features of claim 1.

In order to avoid the diffusion-related problem described and to increase the achievable total strength of a composite material with high residual ductility at the same time, it is necessary to curb the diffusion flows between the laminate partners in a suitable form. This can be achieved when carbon, which as an alloy element makes a substantial contribution to the strength and/or hardness, is provided in the outer layers with a higher C content by comparison with the prior art, thereby enabling a lowering of the diffusion rate of this alloy element by virtue of a smaller concentration difference between outer layers and core layer. The hot-forming material of the invention composed of a three-layer composite material comprises a core layer composed of a hardenable steel which in the press-hardened state of the hot-forming material has a tensile strength >1900 MPa and/or a hardness >575 HV10, more particularly a tensile strength >2000 MPa and/or a hardness >600 HV10, preferably a tensile strength >2100 MPa and/or a hardness >630 HV10, more preferably a tensile strength >2200 MPa and/or a hardness >660 HV10, further preferably a tensile strength >2300 MPa and/or a hardness >685 HV10, and two outer layers bonded substance-to-substance with the core layer and composed of a steel which is softer in comparison with the core layer and which in the press-hardened state of the hot-forming material has a tensile strength >750 MPa and/or a hardness >235 HV10, more particularly a tensile strength >900 MPa and/or a hardness >280 HV10, preferably a tensile strength >1000 MPa and/or a hardness >310 HV10, more preferably a tensile strength >1100 MPa and/or a hardness >340 HV10, more preferably still a tensile strength >1200 MPa and/or a hardness >370 HV10, very preferably a tensile strength >1300 MPa and/or a hardness >400 HV10 and is limited to a tensile strength of not more than 1800 MPa and/or a hardness of not more than 550 HV10, more particularly to a tensile strength of not more than 1700 MPa and/or a hardness of not more than 520 HV10, preferably to a tensile strength of not more than 1600 MPa and/or a hardness of not more than 500 HV10, in order to be able to make the most of the advantages of the steel composite material in comparison with a monolithic extremely high-strength steel material with respect to the mechanical properties with comparable strengths.

HV corresponds to the Vickers hardness and is determined according to DIN EN ISO 6507-1:2005 to -4:2005.

The hot-forming material may be configured, and/or provided to the further process steps, in the form of strip, plate or sheet. The hot-forming material can therefore be integrated into existing, standard hot-forming operations, with no need to undertake any changes to the process chain.

According to a further embodiment of the hot-forming material, the core layer, besides Fe and unavoidable production-related impurities, in wt %, consists of
C: 0.31-0.6%,
Si: up to 0.5%,
Mn: 0.5-2.0%,
P: up to 0.06%,
S: up to 0.03%,
Al: up to 0.2%,
Cr+Mo: up to 1.2%,
Cu: up to 0.2%,
N: up to 0.01%,
Nb+Ti: up to 0.2%,
Ni: up to 0.4%,
V: up to 0.2%,
B: up to 0.01%,
As: up to 0.02%,
Ca: up to 0.01%,
Co: up to 0.02%,
Sn: up to 0.05%.

C is a strength-enhancing alloying element and with increasing content contributes to the increase in strength, and so the content present is at least 0.31 wt %, more particularly at least 0.33 wt %, preferably at least 0.37 wt %, more preferably at least 0.42 wt %, very preferably at least 0.45 wt %, in order to achieve or establish the desired strength. With higher strength there is also an increase in the brittleness, and so the content is limited to not more than 0.6 wt %, more particularly not more than 0.55 wt %, preferably not more than 0.53 wt %, in order not to adversely affect the materials properties, and to ensure sufficient weldability.

Si is an alloying element which can contribute to the solid-solution hardening and depending on content may have positive consequences in an increase in strength, and so a content of at least 0.05 wt % may be present. In order to ensure sufficient rollability, the alloying element is limited to not more than 0.5 wt %, more particularly not more than 0.45 wt %, preferably not more than 0.4 wt %.

Mn is an alloying element which contributes to the hardenability and has positive consequences for the tensile strength, especially in order to bind S to form MnS, and so a content of at least 0.5 wt % is present. In order to ensure sufficient weldability, the alloying element is limited to not more than 2.0 wt %, more particularly not more than 1.7 wt %, preferably not more than 1.5 wt %.

Al as an alloying element may contribute to the deoxidation, and a content with at least 0.01 wt %, more particularly with 0.015 wt %, may be present. The alloying element is limited to not more than 0.2 wt %, more particularly not more than 0.15 wt %, preferably not more than 0.1 wt %, in order substantially to reduce and/or to prevent precipitations in the material, particularly in the form of nonmetallic oxidic inclusions, which may adversely affect the materials properties. For example, the content may be established between 0.02 and 0.06 wt %.

Cr as an alloying element, depending on content, may also contribute to establishing the strength, especially positively to the hardenability, in particular with a content of at least 0.05 wt %. In order to ensure sufficient weldability, the alloying element is limited to not more than 1.0 wt %, more particularly not more than 0.8 wt %, preferably not more than 0.7 wt %.

B as an alloying element may contribute to the hardenability and increase in strength, particularly if N is intended to be bound, and may be present with a content of at least 0.0008 wt %, especially of at least 0.001 wt %. The alloying element is limited to not more than 0.01 wt %, more particularly to not more than 0.008 wt %, since higher contents may have adverse consequences for the materials properties and there would be a reduction in the hardness and/or strength in the material.

Ti and Nb may be alloyed in as alloying elements, individually or in combination, for making the grain finer and/or for binding N, particularly if Ti is present with a content of at least 0.005 wt %. For complete binding of N, the Ti content to be provided would be at least 3.42*N. The alloying elements in combination are limited to not more than 0.2 wt %, more particularly not more than 0.15 wt %, preferably not more than 0.1 wt %, since higher contents may have deleterious consequences for the materials properties, and in particular have adverse consequences for the toughness of the material.

Mo, V, Cu, Ni, Sn, Ca, Co, As, N, P or S are alloying elements which individually or in combination, unless they are alloyed in specifically for the purpose of establishing particular properties, may be counted among the impurities. The contents are limited to not more than 0.2 wt % of Mo, to not more than 0.2 wt % of V, to not more than 0.2 wt % of Cu, to not more than 0.4 wt % of Ni, to not more than 0.05 wt % of Sn, to not more than 0.01 wt % of Ca, to not more than 0.02 wt % of Co, to not more than 0.02 wt % of As, to not more than 0.01 wt % of N, to not more than 0.06 wt % of P, and to not more than 0.03 wt % of S.

The outer layers of the hot-forming material, besides Fe and unavoidable production-related impurities, in wt %, consist of
C: 0.08-0.3%,
Si: up to 1.0%,
Mn: 0.3-3.0%,
P: up to 0.1%,
S: up to 0.06%,
Al: up to 1.0%,
Cr+Mo: up to 1.5%,
Cu: up to 0.3%,
N: up to 0.01%,
Ni: up to 0.3%,
Nb+Ti: up to 0.25%,
V: up to 0.05%,
B: up to 0.01%,
Sn: up to 0.05%, Ca: up to 0.01%,
Co: up to 0.02%.

In order to increase the strength in the near-surface region of the hot-forming material, C as an alloying element is present at not less than 0.08 wt %, and on the basis of the deformability and coatability as well is limited to not more than 0.3 wt %. The C content is for example in the range between 0.13-0.28 wt %, more particularly between 0.17-0.25 wt %.

Si is an alloying element which can contribute to the solid-solution hardening and may have positive consequences in an increase in strength, and so a content of at least 0.01 wt % may be present. In order to ensure sufficient rollability and/or surface quality, the alloying element is limited to not more than 1.0 wt %, more particularly not more than 0.9 wt %, preferably not more than 0.8 wt %.

Mn is an alloying element which contributes to the hardenability and has positive consequences for the tensile strength, especially in order to bind S to form MnS, and so a content of at least 0.3 wt % is present. In order to ensure sufficient weldability, the alloying element is limited to not more than 3.0 wt %, more particularly not more than 2.8 wt %, preferably not more than 2.6 wt %.

Al as an alloying element may contribute to the deoxidation, and a content with at least 0.005 wt %, more particularly with at least 0.01 wt %, may be present. Al is limited to not more than 1.0 wt %, more particularly not more than 0.9 wt %, preferably not more than 0.8 wt %, in order substantially to reduce and/or to prevent precipitations in the material, particularly in the form of nonmetallic oxidic inclusions, which may adversely affect the materials properties.

Cr as an alloying element, depending on content, may also contribute to establishing the strength, in particular with a content of at least 0.05 wt % and limited to not more than 1.3 wt %, more particularly not more than 1.1 wt %, preferably not more than 0.9 wt %, in order to be able to ensure substantially complete coatability of the surface.

B as an alloying element may contribute to the hardenability and increase in strength, particularly if N is intended to be bound, and may be present with a content of at least 0.0008 wt %. The alloying element is limited to not more than 0.01 wt %, more particularly to not more than 0.005 wt %, since higher contents may have adverse consequences for the materials properties and there would be a reduction in the hardness and/or strength in the material.

Ti and Nb may be alloyed in as alloying elements, individually or in combination, for making the grain finer and/or for binding N, in particular with contents of at least 0.001 wt % of Ti and/or of at least 0.001 wt % of Nb. For complete binding of N, the Ti content to be provided would be at least 3.42*N. The alloying elements in combination are limited to not more than 0.25 wt %, more particularly not more than 0.2 wt %, preferably not more than 0.15 wt %, since higher contents may have deleterious consequences for the materials properties, and in particular have adverse consequences for the toughness of the material.

Mo, V, Cu, Ni, Sn, Ca, Co, N, P or S are alloying elements which individually or in combination, unless they are alloyed in specifically for the purpose of establishing particular properties, may be counted among the impurities. The contents are limited to not more than 0.2 wt % of Mo, to not more than 0.05 wt % of V, to not more than 0.3 wt % of Cu, to not more than 0.3 wt % of Ni, to not more than 0.05 wt % of Sn, to not more than 0.01 wt % of Ca, to not more than 0.02 wt % of Co, to not more than 0.01 wt % of N, to not more than 0.1 wt % of P, and to not more than 0.06 wt % of S.

The outer layers preferably likewise consist of a hardenable steel.

According to a further embodiment of the hot-forming material, the outer layers each have a thickness of material of between 5% and 30%, more particular between 10% and 20%, based on the total thickness of the hot-forming material. The thickness of material of the outer layers ought to be calculated such that the positive properties of the core layer are not substantially adversely affected, with the thicknesses of material of the outer layers (per side) being limited to not more than 15%, more particularly to not more than 10%, preferably to not more than 5%, based on the total thickness of the hot-forming material, in order thus to ensure the lightweight construction potential to be derived from the level of strength; an attempt is made to keep the (total) strength of the composite material as close as possible to the level of the extremely high-strength core material, as monolithic material. The hot-forming material or, respectively, the three-layer composite material has a total thickness of material of between 0.6 and 8.0 mm, more particularly between 1.2 and 5.0 mm, and preferably between 1.5 and 4.0 mm.

According to a further embodiment of the hot-forming material, the composite material has been produced by means of cladding, more particularly roll cladding, preferably hot roll cladding, or by means of casting. Preferably the hot-forming material of the invention has been produced by means of hot roll cladding, as disclosed for example in German patent specification DE 10 2005 006 606 B3. Reference is made to that patent specification, the content of which is hereby incorporated into the present application. Alternatively the hot-forming material of the invention can be produced by means of casting, one possibility for its production being disclosed in Japanese laid-open specification JP-A 03 133 630. The metallic production of composite material is general knowledge from the prior art.

In order to minimize the concentration difference of carbon between the individual layers (composite partners), according to one further embodiment of the hot-forming material, the ratio of the C content of the core layer to the C content of the outer layer is <6, more particularly <5, preferably <4, very preferably <3. The objective can thereby be achieved with a smaller drop in the (total) strength of the hot-forming material. A further advantage arising from this is reduced mixing of the locally present chemical composition. This has the effect of lowering formation of mixed regions. The properties of the laminate partners therefore correspond in their regions to those properties known from the respective material in the form of monolithic material.

In order to be able to have a high total strength and also flexural strength with a sufficient thickness of material in the ductile outer layers, the composite material ought to have an extremely high strength in the near-surface region. According to one preferred embodiment, the hot-forming material in the press-hardened state possesses a factor $S > 1000000$ [MPa$^2$], more particularly a factor $S > 1500000$ [MPa$^2$], preferably a factor $S > 2000000$ [MPa$^2$], more preferably a factor $S > 2005000$ [MPa$^2$]. The factor S is defined by the product of the sum of the tensile strengths of the respective layers as a function of the particular thickness of material, and the tensile strength of the outer layer in the press-hardened state. S is determined as follows:

$$S = (\% R_m(\text{core layer}) + \% R_m(\text{outer layers})) * R_m(\text{outer layer})$$, where $R_m$ corresponds to the tensile strengths and % corresponds to the percentage thicknesses of material in the respective layers.

In order to minimize the loss of strength through the provision of an outer layer which is more ductile by comparison with the core layer, it is necessary to use outer layers which themselves provide an extremely high strength and are nevertheless able to compensate the slight residual ductility of the extremely high-strength core layer. Accordingly, in a further preferred embodiment, the hot-forming material in the press-hardened state possesses a factor M>110000 [° MPa]. The factor M is defined by the product of bending angle and tensile strength of the hot-forming material in the press-hardened state. M is determined as follows:

$M=R_m(\text{composite})*\alpha(\text{composite})$, where $R_m$ corresponds to the tensile strength and $\alpha$ to the bending angle of the hot-forming material. $\alpha$ is determined according to VDA 238-100.

In order to be able to utilize the lightweight construction potential of extremely high-strength hot-forming materials, and more particularly to be able to do so without having necessary recourse to subsequent additional measures, such as blasting to remove scale, and to be able to offer a certain barrier effect with respect to corrosion, the hot-forming material, according to a further embodiment, has been provided on one or both sides with an anticorrosion coating, more particularly with a zinc-based or aluminum-based coating, preferably with an AlSi coating, so that the components produced from the hot-forming material can be resistance spot-welded for example into a vehicle structure, for subsequent installation without further cost and effort, and possess sufficient coating-material adhesion.

According to a second aspect, the invention relates to a component produced from a hot-forming material of the invention by means of press hardening, more particularly for producing a component for automaking. The press-hardened hot-forming material exhibits only slight changes in the properties of the individual layers (laminate partners) by comparison with the composite materials known from the prior art, while at the same time having high strength and ductility in the near-surface region.

According to a third aspect, the invention relates to the use of a component produced from the hot-forming material of the invention in bodywork or in the chassis of a land vehicle. This vehicle preferably comprises automobiles, utility vehicles or buses, whether with an internal-combustion engine, purely electrically driven vehicles or vehicles with hybrid drive trains. The components may be used as longitudinal beams or transverse beams or pillars in the land vehicle; for example, they take the form of profiles, especially as a crash profile in the fender, door sill, side impact beam, or in regions in which zero to low deformation/intrusion in the event of a crash is required.

The present invention is elucidated in more detail below, with reference to a FIGURE and examples:

FIG. 1 shows results ascertained in a VDA 238-100 plate bending test on a variety of samples.

DESCRIPTION OF THE EXEMPLARY EMBODIMENTS

From commercial flat steel products, by means of hot roll cladding, hot-forming materials were produced, comprising a three-layer composite material. Steels used as outer layers D1-D7 were those specified in table 1, and steels used as core layers K1-K6 were those specified in table 2. The listed tensile strengths in tables 1 and 2 relate to the press-hardened state. In all, 26 different hot-forming materials were brought together; see table 3. The outer layers D4 and D7, and the hot-forming materials produced with the outer layers D4 and D7, did not correspond to the version according to the invention. Furthermore, two monolithic manganese-boron hot-forming steels R1 and R2 were provided.

Here, in each case, cut-to-size sheets with two outer layers and a core layer in between them were stacked on top of one another, these sheets, at least in regions along their edges, being bonded substance-to-substance to one another, preferably by means of welding, to form a preliminary assembly. The preliminary assembly was brought to a temperature >1200° C. and in a number of steps was hot-rolled to form a composition material with a total thickness of 3 mm, and processed further into cold strip at 1.5 mm. The composite material or, respectively, the hot-forming material was coated on both sides with an aluminum-based coating, an AlSi coating having a coat thickness in each case of 20 μm. The coat thicknesses can be between 5 and 30 μm.

Blanks were divided out of the hot-forming materials produced and the two monolithic hot-forming steels. The blanks were heated to austenitization temperature, more particularly above $A_{c3}$ (based on the core layer), in an oven for around 6 minutes each, and were heated through, and were subsequently subjected to hot forming and cooling in a cooled mold, in each case to form identical components. The cooling rates were >30 K/s. The core layers over the thickness were composed substantially entirely of martensite; in the transition region to the outer layer, there may additionally be fractions of ferrite and/or bainite present. Having established itself in the outer layers was a structure/mixed structure comprising at least one of the following forms: ferrite, bainite, martensite. Within the monoliths, the structure which had established itself was essentially a complete martensitic structure.

Samples were cut from the press-hardened components, and were subjected to a VDA 238-100 plate bending test. The results are brought together in FIG. 1. FIG. 1 shows a diagram in which the total tensile strength in [MPa] is plotted on the x-axis and the bending angle in [°] is plotted on the y-axis. The target region is bounded by a straight line for the minimum total strength of 1600 MPa and by the boundary which results from the relationship M, with $M=R_m$(composite)*$\alpha$ (composite), for the case of M=110000° MPa. This means that the target range (inventive range; see FIG. 1) contains all of the inventive versions for which it is equally the case that they have a total strength of >1600 MPa and a value M of >=110000° MPa, and in particular fulfil the condition S>1000000 [MPa²]. In the case of the noninventive versions, labeled with an o in table 3, it is clearly apparent that they lie outside the target range. Whereas the exemplary embodiment K5-D4 does fulfil the condition S>1000000 [MPa²], on the basis of a high strength in the near-surface region, the performance of this exemplary embodiment is nevertheless well below the value M>110000° MPa, and so the properties of this hot-forming material do not enable economic lightweight construction.

The invention is not limited to the exemplary embodiments shown or to the embodiments in the general description. Instead, the hot-forming material of the invention may also be part of a tailored product, in the form, for example, of part of a tailored welding blank and/or tailored rolled blank.

TABLE 1

|    | C     | Si     | Mn   | P       | S       | Al    | Cr    | Nb      | Ti      | B       | Rm [MPa] |
|----|-------|--------|------|---------|---------|-------|-------|---------|---------|---------|----------|
| D1 | 0.155 | 0.4    | 2.3  | <=0.02  | <=0.003 | 0.7   | 0.7   | 0.025   | 0.025   | 0.0015  | 1152     |
| D2 | 0.14  | 0.23   | 1.15 | <=0.015 | <=0.005 | 0.09  | 0.25  | 0.025   | <=0.008 | 0.0025  | 1216     |
| D3 | 0.23  | 0.25   | 1.3  | 0.01    | 0.0015  | 0.035 | 0.15  | 0.0015  | 0.003   | 0.0028  | 1531     |
| D4 | 0.07  | 0.205  | 0.8  | 0.02    | 0.006   | 0.04  | 0.075 | 0.02    | 0.004   | <=0.001 | 458      |
| D5 | 0.16  | <=0.1  | 1.1  | <=0.015 | <=0.006 | <=0.01| 0.9   | <=0.003 | <=0.008 | <=0.001 | 917      |
| D6 | 0.09  | 0.25   | 0.8  | <=0.025 | <=0.015 | 0.04  | 0.4   | <=0.01  | 0.03    | 0.0025  | 823      |
| D7 | 0.04  | <=0.03 | 0.24 | <=0.015 | <=0.012 | 0.04  | <=0.05| <=0.004 | <=0.004 | <=0.001 | 387      |

TABLE 2

|    | C    | Si    | Mn   | P       | S       | Al    | Cr   | Ni     | Nb     | Ti     | V      | B      | Ca      | Rm [MPa] |
|----|------|-------|------|---------|---------|-------|------|--------|--------|--------|--------|--------|---------|----------|
| K1 | 0.35 | 0.25  | 1.3  | 0.01    | 0.0015  | 0.035 | 0.14 | <=0.06 | 0.0015 | 0.0325 | <=0.01 | 0.0028 | 0.0018  | 1911     |
| K2 | 0.37 | 0.095 | 0.85 | <=0.025 | <=0.005 | 0.043 | 0.2  | <=0.15 | <=0.01 | 0.043  | <=0.05 | 0.002  |         | 1997     |
| K3 | 0.42 | 0.225 | 1.3  | 0.02    | 0.003   | 0.035 | 0.35 | <=0.06 | 0.003  | 0.0275 | <=0.01 | 0.003  | 0.0013  | 2093     |
| K4 | 0.45 | 0.07  | 0.62 | 0.01    | 0.004   | 0.04  | 0.22 | <=0.1  | 0.002  | 0.026  | <=0.01 | 0.003  | <=0.005 | 2304     |
| K5 | 0.48 | 0.22  | 1.2  | 0.01    | 0.002   | 0.035 | 0.24 | <=0.1  | 0.002  | 0.03   | <=0.01 | 0.0032 | 0.002   | 2400     |
| K6 | 0.53 | 0.23  | 1.19 | 0.01    | 0.003   | 0.03  | 0.58 | 0.2    | 0.002  | 0.025  | 0.02   | 0.003  |         | 2518     |

TABLE 3

| Core layer | Proportion | Outer layer | Proportion | Tensile strength [MPa] | Bending angle [°] | Factor M [° MPa] | Factor S [MPa$^2$] |   |
|------------|------------|-------------|------------|------------------------|-------------------|------------------|--------------------|---|
| K1 | 80% | D5 | 10% | 1836 MPa | 65° | 119 340 | 1 620 000 | X |
| K1 | 70% | D5 | 15% | 1792 MPa | 64° | 114 688 | 1 480 000 | X |
| K1 | 60% | D5 | 20% | 1722 MPa | 67° | 115 347 | 1 340 000 | X |
| K1 | 70% | D6 | 15% | 1658 MPa | 67° | 111 086 | 1 318 500 | X |
| K1 | 90% | D7 | 5%  | 1788 MPa | 51° | 90 652  | 657 020   | ○ |
| K1 | 80% | D7 | 10% | 1663 MPa | 63° | 105 102 | 592 040   | ○ |
| K3 | 90% | D7 | 5%  | 1914 MPa | 50° | 95 126  | 725 420   | ○ |
| K3 | 80% | D7 | 10% | 1829 MPa | 53° | 96 754  | 652 840   | ○ |
| K3 | 70% | D7 | 15% | 1646 MPa | 63° | 103 533 | 580 260   | ○ |
| K2 | 80% | D1 | 10% | 1883 MPa | 63° | 118 629 | 2 064 000 | X |
| K2 | 70% | D1 | 15% | 1834 MPa | 74° | 135 716 | 1 896 000 | X |
| K2 | 60% | D1 | 20% | 1795 MPa | 81° | 145 411 | 1 728 000 | X |
| K1 | 80% | D1 | 10% | 1868 MPa | 60° | 112 080 | 1 968 000 | X |
| K1 | 70% | D1 | 15% | 1829 MPa | 65° | 118 885 | 1 812 000 | X |
| K1 | 60% | D1 | 20% | 1683 MPa | 69° | 116 127 | 1 656 000 | X |
| K1 | 80% | D2 | 10% | 1839 MPa | 63° | 115 857 | 1 968 000 | X |
| K1 | 70% | D2 | 15% | 1740 MPa | 66° | 114 866 | 1 812 000 | X |
| K1 | 60% | D2 | 20% | 1712 MPa | 78° | 133 536 | 1 656 000 | X |
| K1 | 80% | D3 | 10% | 1914 MPa | 59° | 112 926 | 2 505 000 | X |
| K1 | 70% | D3 | 15% | 1911 MPa | 60° | 114 660 | 2 332 500 | X |
| K1 | 60% | D3 | 20% | 1843 MPa | 65° | 119 821 | 2 160 000 | X |
| K4 | 70% | D1 | 15% | 2069 MPa | 59° | 122 071 | 2 148 000 | X |
| K5 | 70% | D1 | 15% | 2142 MPa | 55° | 117 810 | 2 232 000 | X |
| K6 | 70% | D1 | 15% | 2216 MPa | 51° | 113 016 | 2 316 000 | X |
| K5 | 76% | D4 | 12% | 2121 MPa | 43° | 91 203  | 980 000   | ○ |
| K5 | 90% | D4 | 5%  | 2309 MPa | 40° | 92 360  | 1 137 500 | ○ |
| R1 | 100% | — |    | 1933 MPa | 45° | 86 985  |           | ○ |
| R2 | 100% | — |    | 1909 MPa | 46° | 87 814  |           | ○ |

X inventive
○ noninventive

The invention claimed is:

1. A hot-forming material composed of a three-layer composite material, comprising a core layer of a hardenable steel which in a press-hardened state of the hot-forming material has at least one of a tensile strength >1900 MPa and a hardness >575 HV10, and two outer layers bonded substance-to-substance with the core layer and composed of a steel which is softer in comparison with the core layer and which in the press-hardened state of the hot-forming material have at least one of a tensile strength >750 MPa and a hardness >235 HV10, wherein the core layer, besides Fe and unavoidable production-related impurities, in wt %, consists of:

C: 0.31-0.6%, Si: up to 0.5%, Mn: 0.5-2.0%, P: up to 0.06%, S: up to 0.03%, Al: up to 0.2%, Cr+Mo: up to 1.2%, Cu: up to 0.2%, N: up to 0.01%, Nb+Ti: up to 0.2%, Ni: up to 0.4%, V: up to 0.2%, B: up to 0.01%, As: up to 0.02%, Ca: up to 0.01%, Co: up to 0.02%, Sn: up to 0.05%; and wherein the outer layers, besides Fe and unavoidable production-related impurities, in wt %, consist of:

C: 0.13-0.3%, Si: up to 1.0%, Mn: 0.3-3.0%, P: up to 0.1%, S: up to 0.06%, Al: up to 1.0%, Cr+Mo: up to 1.5%, Cu: up to 0.3%, N: up to 0.01%, Ni: up to 0.3%, Nb+Ti: up to 0.25%, V: up to 0.05%, B: up to 0.01%, Sn: up to 0.05%, Ca: up to 0.01%, Co: up to 0.02%.

2. The hot-forming material as claimed in claim 1 wherein the core layer has a C content between 0.33-0.55 wt %.

3. The hot-forming material of claim 1 wherein the outer layers each have a thickness of material of between 5% and 30%, based on the total thickness of the hot-forming material.

4. The hot-forming material of claim 1 wherein the composite material has been produced by means of cladding or by means of casting.

5. The hot-forming material of claim 1 wherein the ratio of the C content of the core layer to the C content of the outer layer is <6.

6. The hot-forming material of claim 1 wherein the hot-forming material in the press-hardened state possesses a factor S>1 000 000 [MPa²].

7. The hot-forming material of claim 6 wherein the hot-forming material in the press-hardened state possesses a factor M>110 000 [° MPa].

8. The hot-forming material of claim 6 wherein the hot-forming material has been provided on one or both sides with an anticorrosion coating, including one of a zinc-based coating and an aluminum-based coating.

9. The hot-forming material of claim 8 wherein the hot-forming material is part of a tailored product, including one of a tailored welded blank and a tailored rolled blank.

10. A component produced from a hot-forming material as claimed in claim 1 by means of press hardening.

11. The use of the component as claimed in claim 10 in bodywork or in the chassis of a land vehicle.

12. The hot-forming material of claim 1 wherein the core layer of the hardenable steel in the press-hardened state has at least one of a tensile strength >2300 MPa and a hardness >685 HV10.

13. A hot-forming material composed of a three-layer composite material, comprising a core layer of a hardenable steel which in a press-hardened state of the hot-forming material have at least one of a tensile strength >1900 MPa and/or a hardness >575 HV10, and two outer layers bonded substance-to-substance with the core layer and composed of a steel which is softer in comparison with the core layer and which in the press-hardened state of the hot-forming material have at least one of a tensile strength >1200 MPa and a hardness >370 HV10.

14. The hot-forming material of claim 2 wherein the core layer has a C content between 0.37-0.53 wt %.

15. The hot-forming material of claim 1 wherein the outer layers have a C content between 0.17-0.25 wt %.

16. The hot-forming material of claim 3 wherein the outer layers have a thickness of material between 10% and 20%, based on the total thickness of the hot-forming material.

17. A hot-forming material composed of a three-layer composite material, comprising a core layer of a hardenable steel which in a press-hardened state of the hot-forming material has at least one of a tensile strength >1900 MPa and a hardness >575 HV10, and two outer layers bonded substance-to-substance with the core layer and composed of a steel which is softer in comparison with the core layer and which in the press-hardened state of the hot-forming material have at least one of a tensile strength >750 MPa and a hardness >235 HV10;

wherein the core layer, besides Fe and unavoidable production-related impurities, in wt %, consists of:
C: 0.31-0.6%, Si: up to 0.5%, Mn: 0.5-2.0%, P: up to 0.06%, S: up to 0.03%, Al: up to 0.2%, Cr+Mo: up to 1.2%, Cu: up to 0.2%, N: up to 0.01%, Nb+Ti: up to 0.2%, Ni: up to 0.4%, V: up to 0.2%, B: up to 0.01%, As: up to 0.02%, Ca: up to 0.01%, Co: up to 0.02%, Sn: up to 0.05%;

wherein the outer layers, besides Fe and unavoidable production-related impurities, in wt %, consist of:
C: 0.08-0.3%, Si: up to 1.0%, Mn: 0.3-3.0%, P: up to 0.1%, S: up to 0.06%, Al: up to 1.0%, Cr+Mo: up to 1.5%, Cu: up to 0.3%, N: up to 0.01%, Ni: up to 0.3%, Nb+Ti: up to 0.25%, V: up to 0.05%, B: up to 0.01%, Sn: up to 0.05%, Ca: up to 0.01%, Co: up to 0.02%; and wherein the ratio of C content of the core layer to the C content of the outer layer is <3.

18. The hot-forming material as claimed in claim 1 wherein the outer layers, besides Fe and unavoidable production-related impurities, in wt %, have a C content that consists of: C: 0.13-0.28%.

* * * * *